(No Model.) 2 Sheets—Sheet 1.
H. BERGE.
STONE CLAMP AND DOWEL.
No. 365,427. Patented June 28, 1887.
Fig. 1.
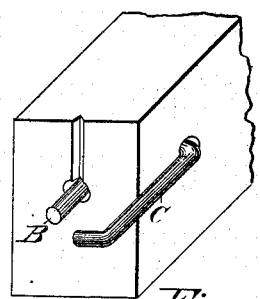
Fig. 2.
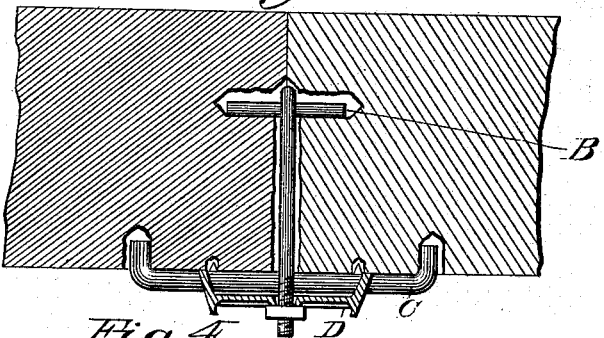
Fig. 3. Fig. 4.
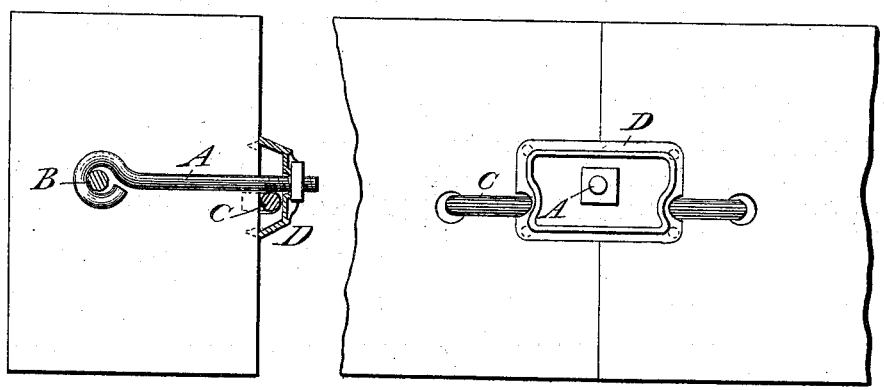
Fig. 5.
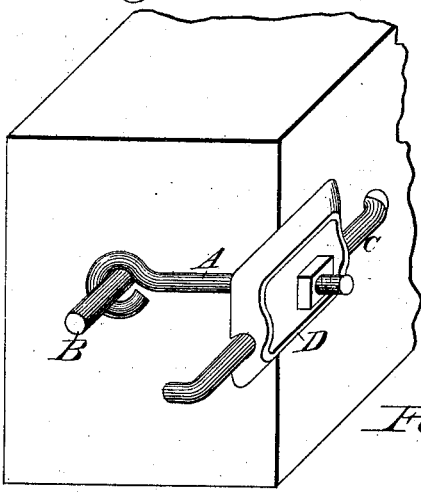
Fig. 6.
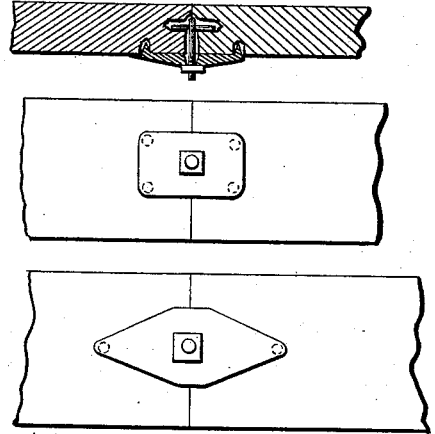
Fig. 7.
Witnesses:
W. S. Gomelius
J. F. Bauer
Inventor:
Henry Berge (No Model.) 2 Sheets—Sheet 2.
H. BERGE.
STONE CLAMP AND DOWEL.
No. 365,427. Patented June 28, 1887.
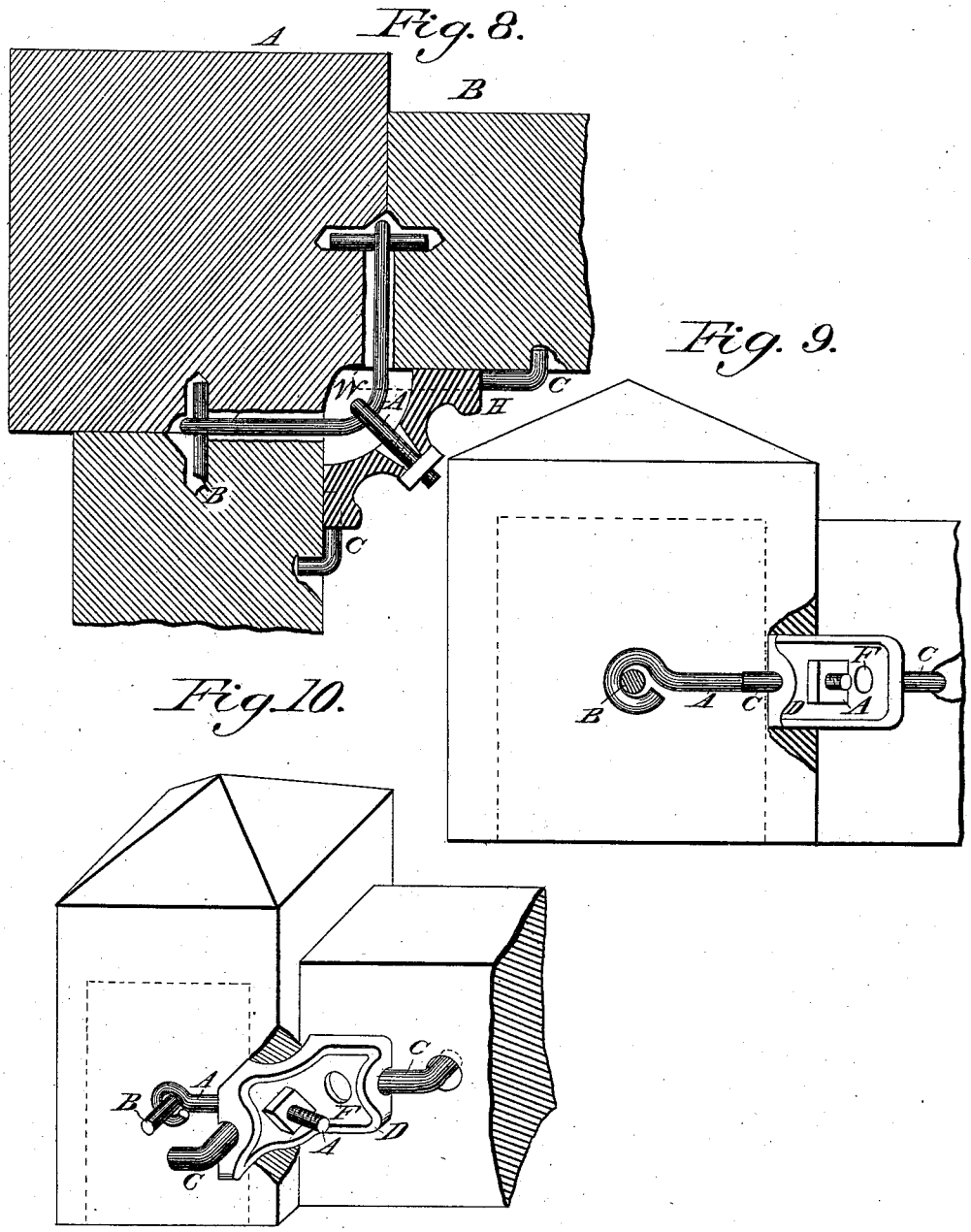

UNITED STATES PATENT OFFICE.

HENRY BERGE, OF BALTIMORE, MARYLAND.

STONE CLAMP AND DOWEL.

SPECIFICATION forming part of Letters Patent No. 365,427, dated June 28, 1887.

Application filed February 19, 1886. Serial No. 192,599. (No model.)

*To all whom it may concern:*

Be it known that I, HENRY BERGE, a citizen of the United States, residing at Baltimore, Maryland, have invented a new and useful Adjustable Stone Clamp and Dowel, of which the following is a specification.

My invention relates to an improvement in clamping or fastening together pieces of stone, such as cemetery-lot inclosures, steps, and building-stones in general.

The objects of my invention are, first, to do away with the necessity of fastening the dowel or pin B, which has to be put in loosely when the stones are set, (on account of the necessary play-room to raise or lower, and the holes not being always drilled in line,) with melted sulphur, which is run in the joint after the stones are set, and which sulphur corrodes the metal and discolors the stone; and, second, to prevent the opening of the joint (which is caused by the action of heat and cold loosening the clamp C) by connecting dowel B with clamp C through the connecting-piece A and plate D, making a straight joint, which takes the greater part of the pressure from the edges and corners and transfers it to the center of the stone, and which, by either wedge or screw, can be adjusted to the exact distance between dowel B and plate D. I attain these objects by the following construction, which is illustrated in the accompanying drawings, of which—

Figure 1 represents the clamp intended to be improved; Figs. 2, 3, and 4, the plan, elevation, and side view of the improved clamp; Fig. 5, a perspective view of the same; Figs. 6 and 7 the same as used on light work. Fig. 7 shows plan of clamp for a corner-post in a right angle; Fig. 8, the elevation, and Fig. 9 a perspective view of same.

B is the dowel or pin, as usual.

A is a screw-bolt which makes a three-fourths turn or full turn around B, and has a thread cut on the other end.

D is a plate with an oval hole in the center to let A freely pass. It has also two notches on the perpendicular sides to go over the clamp C and hold it, and projections on each corner, which are let into the stones, and also act as clamps. It has to be made strong enough to resist the pressure of screw-bolt A by placing two ribs along the perpendicular edges.

C is the clamp, made as usual, and it and the other parts may be made of galvanized, wrought, malleable, or cast iron, brass, or copper, according to circumstances.

For lighter work I make clamp C and plate D in one piece, according to the strain to be met, but with the screw-bolt A around dowel B, as above, for heavier work. (See Figs. 6 and 7.) The corner-clamp works on the same principle. The corner-stone is pulled in against the plate D by the dowels B B and connecting-piece A, which is here in two sections, an angle-piece with two eyes to go over both dowels, and the screw-hook to take hold at the corner and to take up all the slack. Clamp C is either cast into plate D, hooked into holes F at the ends of D, or for heavy work hooked into connecting-piece A, as shown by dotted line in Fig. 7 at H W, as the angle and the nature of the work require.

The clamp is operated as follows: The dowel B (with bolt A around it) is put in one stone. Then, after the other stone is moved up and the joint closes satisfactorily, clamp C is put in the holes drilled for it, plate D is placed over it and the thread part of A, the nut is drawn tight, and the two pieces of stone are fastened together securely and permanently without depending on cement or sulphur, and no danger of corners breaking off.

Having now fully described my invention, what I desire to claim and secure by Letters Patent is—

The dowel B, connected with clamp C by a bolt or connecting-piece A and plate D, in order to press both together at the same time and transfer the greater part of the pressure from the edges and corners to the center of the stone in the different ways shown and as the nature of the work requires, and as set forth substantially.

HENRY BERGE.

Witnesses:
JOSEPH F. BAUER,
CHAS. F. REIGN.